Figure 1:
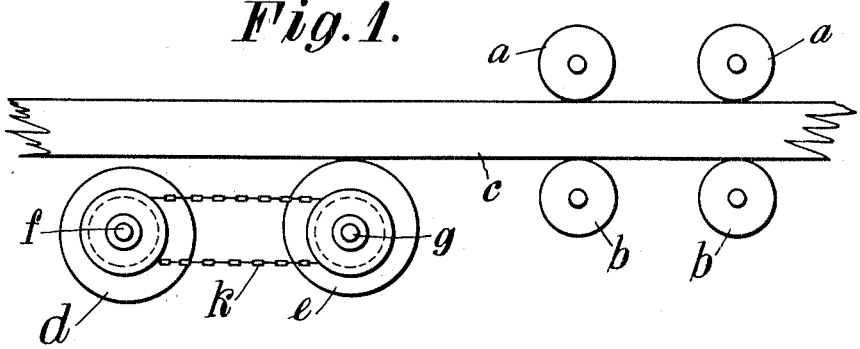

A. J. TENOW & C. E. ANDERSON.
SAWING MACHINE.
APPLICATION FILED NOV. 15, 1911.

1,059,235.

Patented Apr. 15, 1913.

Witnesses.

Inventors.

UNITED STATES PATENT OFFICE.

ADOLF JULIUS TENOW AND CARL ERIK ANDERSON, OF STOCKHOLM, SWEDEN, ASSIGNORS TO J. & C. G. BOLINDERS MEKANISKA VERKSTADS AKTIEBOLAG, OF STOCKHOLM, SWEDEN.

SAWING-MACHINE.

1,059,235.  Specification of Letters Patent.  Patented Apr. 15, 1913.

Application filed November 15, 1911. Serial No. 660,500.

*To all whom it may concern:*

Be it known that we, ADOLF JULIUS TENOW and CARL ERIK ANDERSON, subjects of the King of Sweden, residing at Stockholm, in the Kingdom of Sweden, have invented new and useful Improvements in Sawing-Machines, of which the following is a specification, reference being had to the drawing accompanying and forming a part hereof.

In machines for sawing crooked or curved timber, in which the rolls of the saw frame are adjustable relatively to each other so as to feed the timber not rectilinearly but along an arc corresponding to the curvature of the timber, the feed rolls are usually provided with teeth adapted to engage the timber and reliably move it along the curvilinear path. When the timber is fed forward in such manner, its ends swing, *i. e.* the rear end (usually the butt-end) moves from without inward, toward the middle of the frame, while the forward end (usually the top-end) moves from the middle outward. During this movement the ends of the timber slide on their supports by which a considerable frictional resistance arises. When the feed rolls are provided with teeth, as hereinbefore stated, the frictional resistance has practically no disadvantageous influence on the feed movement of the timber, since the teeth, due to their firm grip, cause the timber to accurately move with the rolls. If, on the contrary, the rolls are not provided with teeth but merely slightly grooved or even smooth, they cannot bring the timber with themselves, since the frictional resistance against the supports predominates and turns the timber between the rolls so that the sawing does not take place along the desired arc. This is for instance the case in square sawing, when the timber is first sawed at two sides in order to be thereupon placed with the plane sides bearing on the feed rolls and sawed in a direction at right angles to the former. In this case toothed rolls cannot be used since the plane surfaces bearing on the rolls would be damaged. Only smooth or slightly grooved rolls can be used.

The principal object of the invention is to make it possible to enable such square sawing to be performed in sawing crooked or curved timber along its curvature, but the invention is applicable in all cases where it is necessary, in sawing curvilinearly, to remove or reduce the friction of the timber against its supporting members.

The invention consists, chiefly, in this that the supporting member or supporting members, suitably a roll or rolls or the like extending across the path of movement of the timber, are movable in the transverse direction of the said path in such manner as to partake in the lateral movement of the swinging timber. Since in such case the timber will not move relatively to its supporting member or members, counted in the traverse direction of the path of movement of the timber, no frictional rsistance to the swinging movement will arise. If the supporting member or members consist of a roll or rolls, no frictional resistance to the movement of the timber can arise in either direction, since in such case the roll or rolls will not only move transversely with the timber but will at the same time rotate as the timber moves forward.

Preferably, two or more supporting rolls are attached eccentrically to their shafts, at such angles to each other as to alternately support the timber, and connected to each other in such manner as to rotate simultaneously, by which the advantage is gained that the sliding movement of the rolls is made comparatively small.

The invention further consists in certain novel features of construction and in the construction and combination of parts hereinafter set forth.

In the drawing, we have shown diagrammatically a device embodying the invention.

Figure 2:
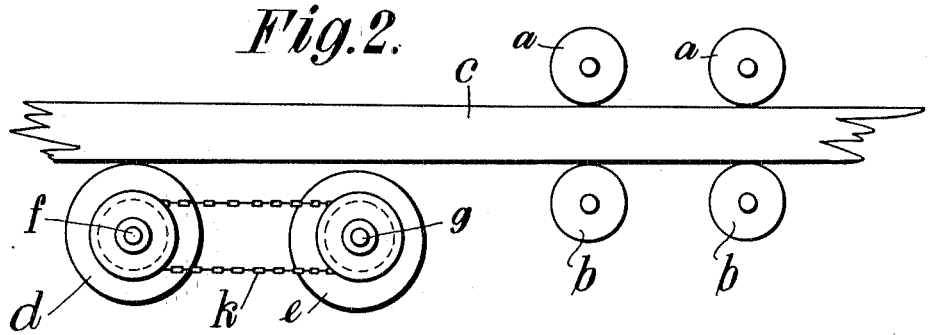
Figure 3:
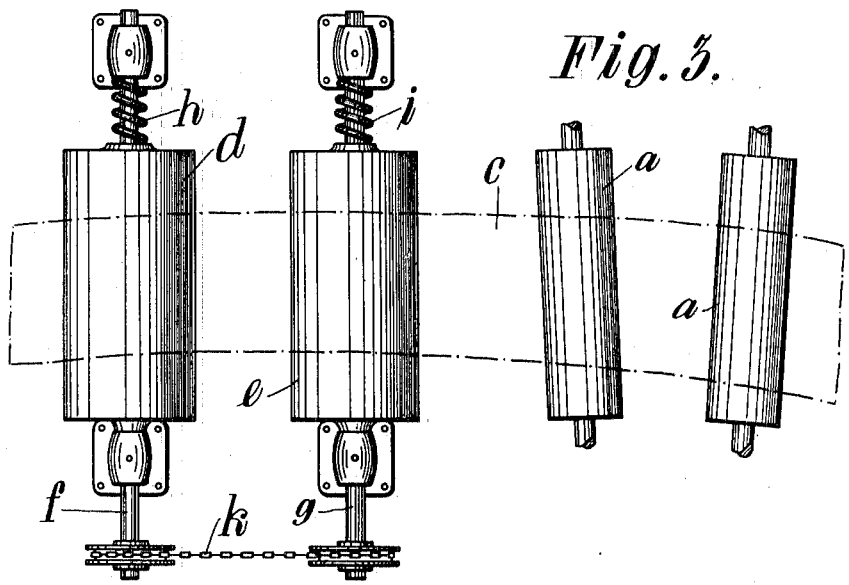

Figures 1 and 2 are side views of the said device with the supporting members in two opposite end positions. Fig. 3 is a plan view of the same device.

Referring to the drawing, $a$ and $b$ are the rolls of the frame saw acting to feed the timber $c$. In Fig. 3 the rolls are shown adjusted for feeding the timber $c$ along a line corresponding to its curvature. Placed in front of and, preferably, also behind the rolls $a$ and $b$ are two supporting rolls $d$ and $e$. These rolls are movable on their shafts $f$ and $g$. Placed on the said shafts are helical springs $h$, $i$ tending to move the rolls in a direction opposite to that in which they are moved by the swinging timber. As shown in the drawing, the rolls are attached eccentrically to their shafts, at such angles to each other as to alternately support the timber, for instance opposite to each other, when two rolls are used, so that the timber is supported by one roll only at a time. The rolls are operatively connected by a driving chain $k$ or other suitable mechanism so as to rotate simultaneously with the same speed.

The contrivance described operates as follows: When the rolls $a$ and $b$ feed the timber along an arc corresponding to the curvature of the timber, the latter rests for some time on one of the auxiliary rolls, for instance the roll $e$, as shown in Fig. 1. This roll $e$ not only rotates as the timber is fed forward but is at the same time moved longitudinally on its shaft $g$, due to the swinging movement of the timber. When the rolls $e$ and $d$ have rotated through such an angle that the roll $d$ bears on the timber, while the roll $e$ moves away from the same, the latter roll $e$ is moved by the compressed spring $i$ acting on the same back into its initial position. The timber now rotates the roll $d$ and causes it to slide in the same manner as before the roll $e$ was slid, until the latter reëngages the timber while the roll $d$ leaves the same. The rolls $d$ and $e$ will thus alternately support the timber so that at each time the sliding movement of the roll is comparatively small. If a single roll were used, the sliding movement of the same would, on the contrary, be considerable, sometimes up to 50 centimeters, which is disadvantageous in respect to room and for other reasons.

We claim:

1. In a machine for sawing curved timber, the combination of feed rolls placed in position for feeding the timber along its curvature, and rotary and laterally slidable auxiliary supporting rolls mounted across the path of the timber and adapted to partake, by friction, in the movements of the timber as it is fed forward by the feed rolls.

2. In a machine for sawing curved timber, the combination of feed rolls placed in position for feeding the timber along its curvature, rotary and laterally slidable auxiliary supporting rolls mounted across the path of the timber and adapted to partake, by friction, in the movements of the timber as it is fed forward by the feed rolls, and means for automatically retracting the said auxiliary supporting rolls when the timber leaves the same.

3. In a machine for sawing curved timber, the combination of feed rolls placed in position for feeding the timber along its curvature, rotary and laterally slidable auxiliary supporting rolls mounted eccentrically across the path of the timber and connected to each other in such a manner as to alternately support the same, and means for automatically retracting the said auxiliary supporting rolls when the timber leaves the same.

ADOLF JULIUS TENOW.
CARL ERIK ANDERSON.

Witnesses:
MARCEL L. FOUCARD,
G. WESTMAN.